(12) United States Patent
Paolella et al.

(10) Patent No.: US 11,747,555 B2
(45) Date of Patent: Sep. 5, 2023

(54) OPTICAL ASSEMBLY HAVING COMMONLY-SHAPED OPTICAL MODULES AND ASSOCIATED METHODS

(71) Applicant: EAGLE TECHNOLOGY, LLC, Melbourne, FL (US)

(72) Inventors: Arthur C. Paolella, Indian Harbour Beach, FL (US); Christopher A. Corey, Palm Bay, FL (US); Morgan F. Schwartz, Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/449,821

(22) Filed: Oct. 4, 2021

(65) Prior Publication Data

US 2023/0107643 A1  Apr. 6, 2023

(51) Int. Cl.
*G02B 6/42* (2006.01)
*G02B 6/12* (2006.01)
*G02B 6/13* (2006.01)

(52) U.S. Cl.
CPC ..... *G02B 6/12002* (2013.01); *G02B 6/12004* (2013.01); *G02B 6/13* (2013.01); *G02B 6/4278* (2013.01)

(58) Field of Classification Search
CPC . G02B 6/12002; G02B 6/4278; A63H 33/086
See application file for complete search history.

(56) References Cited

U.S. PATENT DOCUMENTS

| | | | |
|---|---|---|---|
| 4,894,040 A | * | 1/1990 | Bach ............ G09B 23/22 446/175 |
| 5,994,774 A | | 11/1999 | Siegel et al. |
| 6,801,254 B1 | | 10/2004 | Nishio |
| 6,833,628 B2 | | 12/2004 | Brandenburg et al. |
| 7,139,448 B2 | | 11/2006 | Jain et al. |
| 7,596,473 B2 | | 9/2009 | Hansen et al. |

(Continued)

FOREIGN PATENT DOCUMENTS

| | | |
|---|---|---|
| CN | 101632156 B | 6/2012 |
| CN | 102176465 B | 5/2014 |

(Continued)

OTHER PUBLICATIONS

A Simple, Small-Scale Lego Colorimeter with a Light-Emitting Diode (LED) Used as Detector (Year: 2014).*

(Continued)

*Primary Examiner* — Eric Wong
(74) *Attorney, Agent, or Firm* — Allen, Dyer, Doppelt & Gilchrist, P.A.

(57) ABSTRACT

An optical assembly may include a base having a body defining a base mating feature surface. Optical modules are arranged in side-by-side relation on the base and in optical communication with each other. Each optical module includes a housing that is commonly-shaped with other housings. Each housing has a bottom wall defining a module mating feature surface coupled with a respective area of the base mating feature surface and at least one sidewall with an optical communication opening aligned with the at least one optical communication opening of an adjacent housing. A respective optical device is within each housing.

21 Claims, 9 Drawing Sheets

(56) References Cited

U.S. PATENT DOCUMENTS

| | | | |
|---|---|---|---|
| 8,885,355 B2 | 11/2014 | Stanley | |
| 10,645,812 B2 | 5/2020 | Maccurdy et al. | |
| 10,748,867 B2 | 8/2020 | Wicker et al. | |
| 10,826,499 B2 | 11/2020 | Sullam et al. | |
| 2010/0321880 A1* | 12/2010 | Yeo | H05K 7/1492 361/679.02 |
| 2012/0207426 A1 | 8/2012 | Doany et al. | |
| 2013/0301264 A1* | 11/2013 | Van Gompel | F21V 17/005 362/236 |
| 2013/0308898 A1 | 11/2013 | Doerr et al. | |
| 2016/0361662 A1* | 12/2016 | Karunaratne | G06F 3/038 |
| 2018/0003912 A1* | 1/2018 | Sedor | G02B 6/4452 |
| 2018/0132056 A1 | 5/2018 | Leedy | |
| 2018/0217337 A1* | 8/2018 | Smith | G02B 6/3866 |
| 2019/0178473 A1* | 6/2019 | Mignot | F21V 17/02 |
| 2020/0261818 A1 | 8/2020 | Kaersgaard et al. | |
| 2022/0030449 A1* | 1/2022 | Boledovic | H04M 1/24 |

FOREIGN PATENT DOCUMENTS

| | | | | |
|---|---|---|---|---|
| JP | 2003317851 A | * | 11/2003 | G02B 6/381 |
| TW | 569053 B | | 1/2004 | |
| TW | 200532761 A | | 10/2005 | |
| WO | WO-2016099260 A1 | * | 6/2016 | A63H 33/042 |

OTHER PUBLICATIONS

Miniaturization of fuorescence sensing in optofuidic devices (Year: 2020).*
Brick Blogger (Year: 2014).*
MIT's new computer chip design lets you clip on parts like LEGOs (Year: 2022).*

* cited by examiner

OPTICAL ASSEMBLY HAVING COMMONLY-SHAPED OPTICAL MODULES AND ASSOCIATED METHODS

FIELD OF THE INVENTION

The present invention relates to the field of optical assemblies, and, more particularly, to optical modules that each carry a respective optical device and related methods.

BACKGROUND OF THE INVENTION

A photonic integrated circuit (PIC) and similar optical devices are optical circuits that integrate photonic functions similar to an electronic integrated circuit. Information signals may be imposed on optical wavelengths in a PIC, usually in the visible spectrum or near infrared 850 nanometers to 1,650 nanometers. A photonic integrated circuit may be fabricated from different materials, including electric-optic crystals such as lithium niobate, silica on silicon, Silicon on insulator, various polymers, and semiconductor materials that are used to make semiconductor lasers such as GaAs and InP lasers.

Photonic integrated circuits may include different optical circuits such as low loss interconnected waveguides, power splitters, optical amplifiers, optical modulators, filters, lasers and detectors. End-use applications for photonic integrated circuits include fiber-optic communication systems, biomedical applications, and photonic computing. For example, a common application for a photonic integrated circuit is an arrayed waveguide grating used in optical multiplexers and demultiplexers for use with wavelength division multiplexed (WDM), fiber-optic communication systems.

Other applications for photonic integrated circuits include multi-channel transceivers, tunable dispersion compensators, RF photonic processors and phased arrays. Most photonic integrated circuits, however, have fixed functionality and utility, thus limiting their use in other systems. Because most photonic integrated circuits do not have multi-function capabilities, they are limited in configuration to specialized end-use applications. Usually, a photonic integrated circuit is designed for a specific use and cannot be integrated into other circuits, and for that reason, its use is limited to the specific configuration for which it was designed.

SUMMARY OF THE INVENTION

In general, an optical assembly may comprise a base having a body defining a base mating feature surface and a plurality of optical modules arranged in side-by-side relation on the base and in optical communication with each other. Each optical module may comprise a housing that is commonly-shaped with other housings. Each housing may have a bottom wall defining a module mating feature surface coupled with a respective area of the base mating feature surface and at least one sidewall with an optical communication opening therein aligned with the at least one optical communication opening of an adjacent housing. A respective optical device may be within each housing.

Each optical module may comprise at least one conductive trace carried by the housing. Each housing may have a top wall defining a top wall mating feature surface compatible with the bottom wall mating feature surface. Each top wall may have at least one optical communication opening therein.

The at least one optical device may comprise an active photonic integrated circuit (PIC). The active PIC may comprise at least one of a source, a filter, a multiplexer, a receiver, a matrix math device, a switch, a demultiplexer, a tunable dispersion compensator, and a channel add/drop device. The at least one optical device may comprise a passive photonic integrated circuit (PIC). The passive PIC may comprise at least one of a waveguide, a splitter, and a combiner. A respective lens may be in each optical communication opening. The housing may comprise a photocured polymer.

Another aspect is directed to a method for making an optical assembly that may comprise mounting a plurality of optical modules arranged in side-by-side relation on a base comprising a body defining a base mating feature surface and in optical communication with each other. Each optical module may comprise a housing being commonly-shaped with other housings, and each housing having a bottom wall defining a module mating feature surface coupled with a respective area of the base mating feature surface and at least one sidewall with an optical communication opening therein aligned with the at least one optical communication opening of an adjacent housing. The method includes mounting a respective optical device within each housing.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
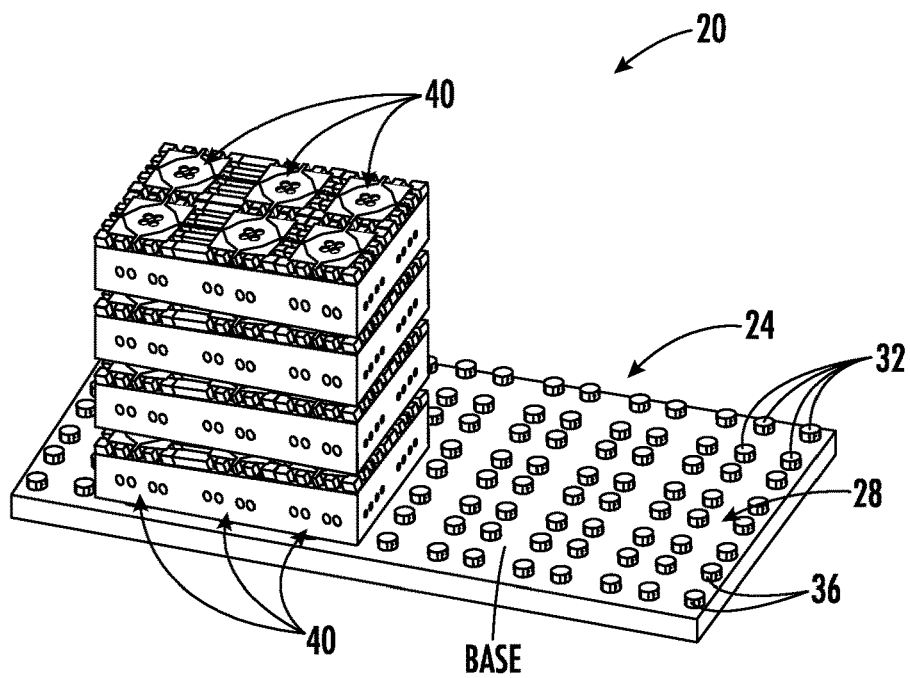
FIG. 1 is an isometric view of the optical assembly according to the invention.
Figure 2:
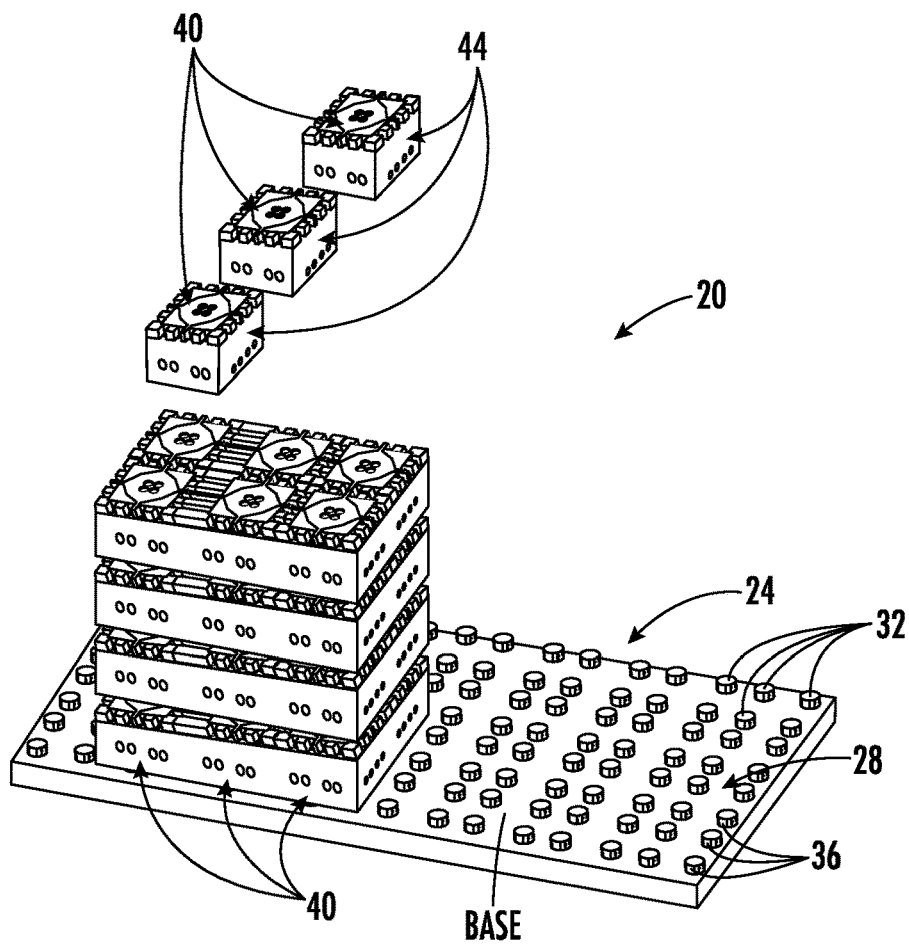
FIG. 2 is another isometric view of the optical assembly of FIG. 1 and showing three optical modules removed from the optical assembly.
Figure 3:
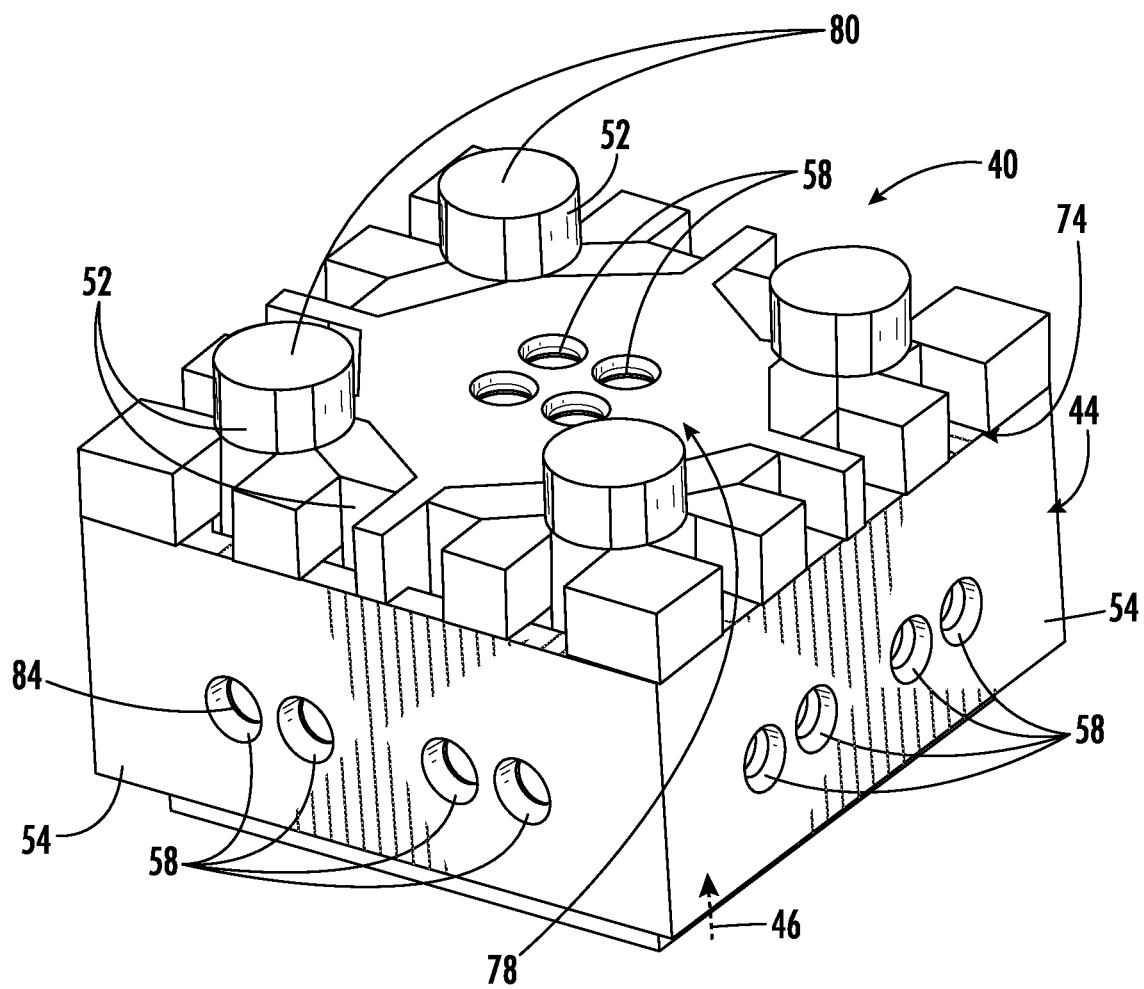
FIG. 3 is an isometric view of an optical module used in the optical assembly of FIGS. 1 and 2.

Referring initially to FIGS. 1 and 2, an optical assembly is illustrated generally at 20 and includes a base 24 having a body with a top surface defining a base mounting feature surface 28. In this example, the base 24 is rectangular configured and the base mating feature surface 28 includes a plurality of mounting posts 32 that may each include one or more conductive traces 36. A plurality of optical modules 40 are arranged in side-by-side relation on the base 24 and engage the mounting posts 32, and the optical modules are in optical communication with each other, forming the optical assembly 20. The optical modules 40 may be arranged in a planar configuration on the base 24 or stacked on top of each other as shown in the three-dimensional configuration of the optical assembly 20 of FIGS. 1 and 2. Three of the optical modules 40 shown in the optical assembly 20 of FIG. 2 are removed from the optical assembly to show their side-by-side relation and how they fit together for optical communication with each other.

Each optical module 40 includes a housing 44 that is commonly-shaped with other housings forming each optical module, such as shown by the common shape of each of the three removed optical modules in FIG. 2. Each housing 44 has an interior cavity 45 (FIGS. 4 and 5) and a bottom wall 46 (FIG. 6) defining a module mating feature surface 48 that is coupled with the respective area of the base mating feature surface 28 on the base 24. For example, the mounting posts 32 may be formed on the illustrated rectangular base 24 in a symmetrical, ordered arrangement of columns and rows and may be spaced equidistant from each other. Each post 32 on the base 24 is configured to engage with the module mating feature surface 48 on a respective optical module 40, which in an example shown in FIG. 6, is formed as four openings 50 in the bottom wall 46 of each optical module (FIG. 6). Each opening 50 is configured to receive a mounting post 32 formed on the base 24, and each opening is spaced and configured, such as in a square configuration, to engage with four mounting posts on the base 24. The coupling of the housing 44 of each optical module 40 on the base 24 aligns each optical module in side-by-side relation on the base and in optical communication with an adjacent optical module as shown in FIGS. 1 and 2. The mounting posts 32 may be cylindrical or rectangular configured, e.g., square in configuration, and configured to engage the openings 50 in the bottom wall 46 (FIG. 6).

In this example, each opening 50 may include conductive traces 52 that may contact conductive traces 36 on a mounting post 32. Each optical module 40 includes at least one side wall 54, which is illustrated as four side walls (FIGS. 3-6) making a square configured housing 44 having its interior cavity 45 formed by the side walls. At least one optical communication opening 58 is formed in each of the side walls 54 of an optical module 40, and aligning with at least one optical communication opening in the side wall of an adjacent optical module when both optical modules are mounted on the base 24 adjacent to each other. In the example shown in FIGS. 3-6, each side wall 54 of an optical module 40 includes four optical communication openings 58 with two optical communication openings being spaced closer to each other to form two pairs of optical communication openings that may be aligned with respective pairs of optical communication openings on an adjacent housing 44 of an optical module when received on the base 24.

Figure 4:
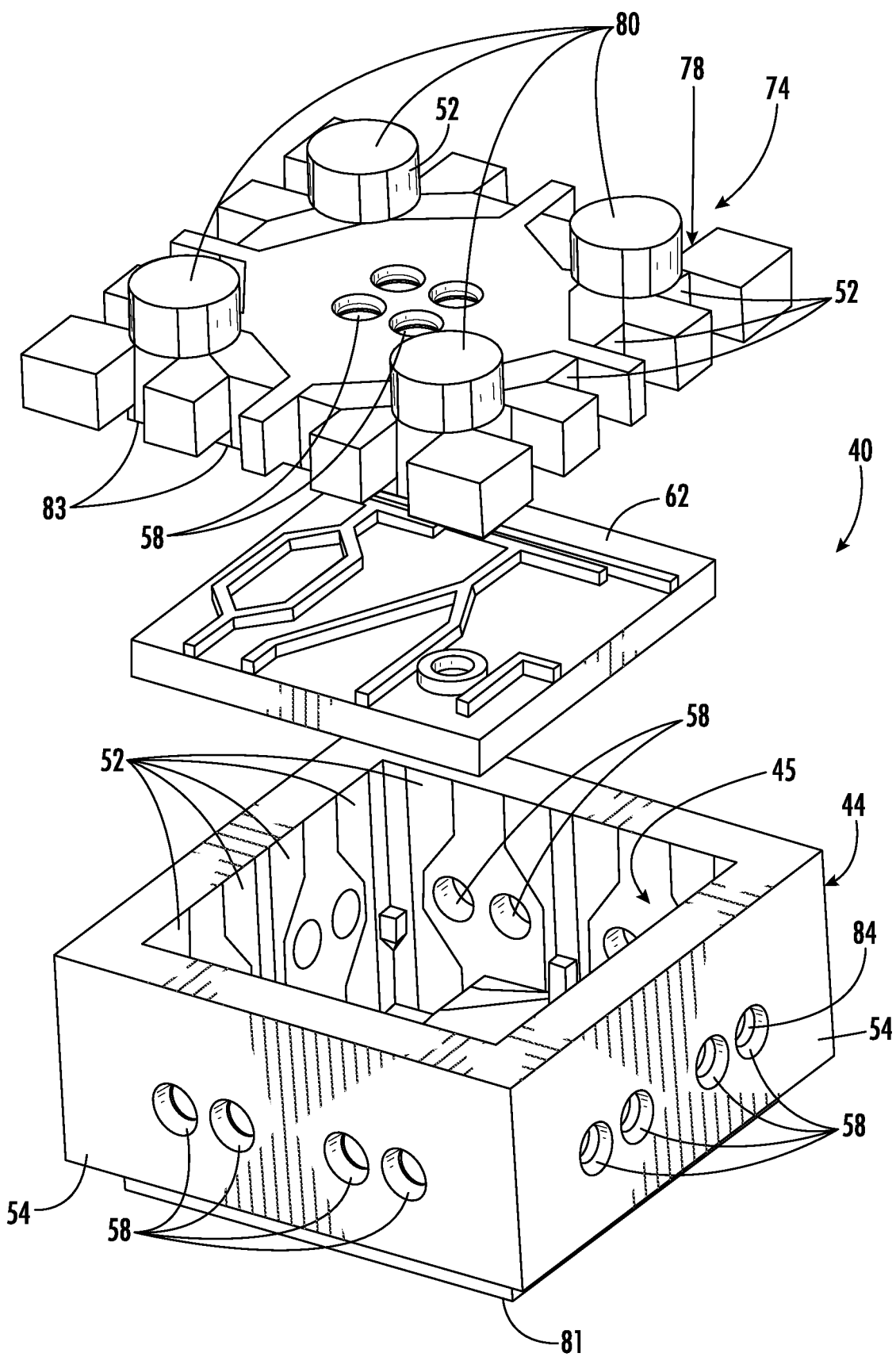
FIG. 4 is an exploded isometric view of the optical module of FIG. 3.
Figure 5:
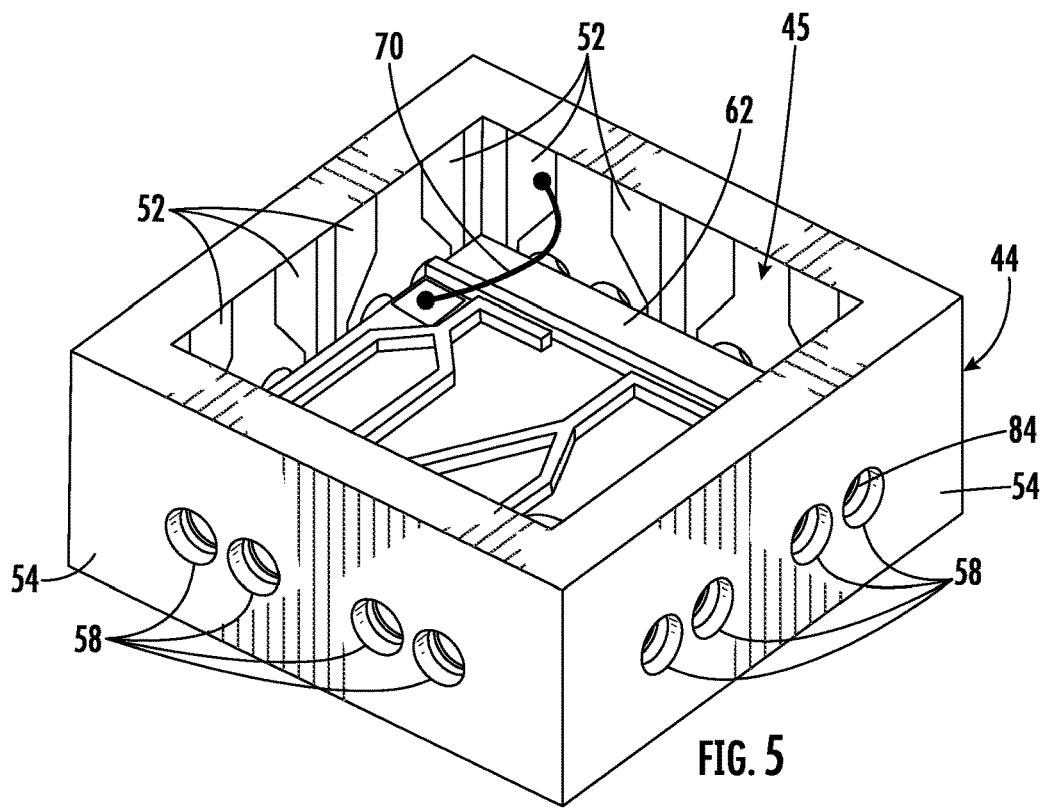
FIG. 5 is an isometric view of the optical module with the top wall removed and showing a conductive trace carried by the housing.
Figure 6:
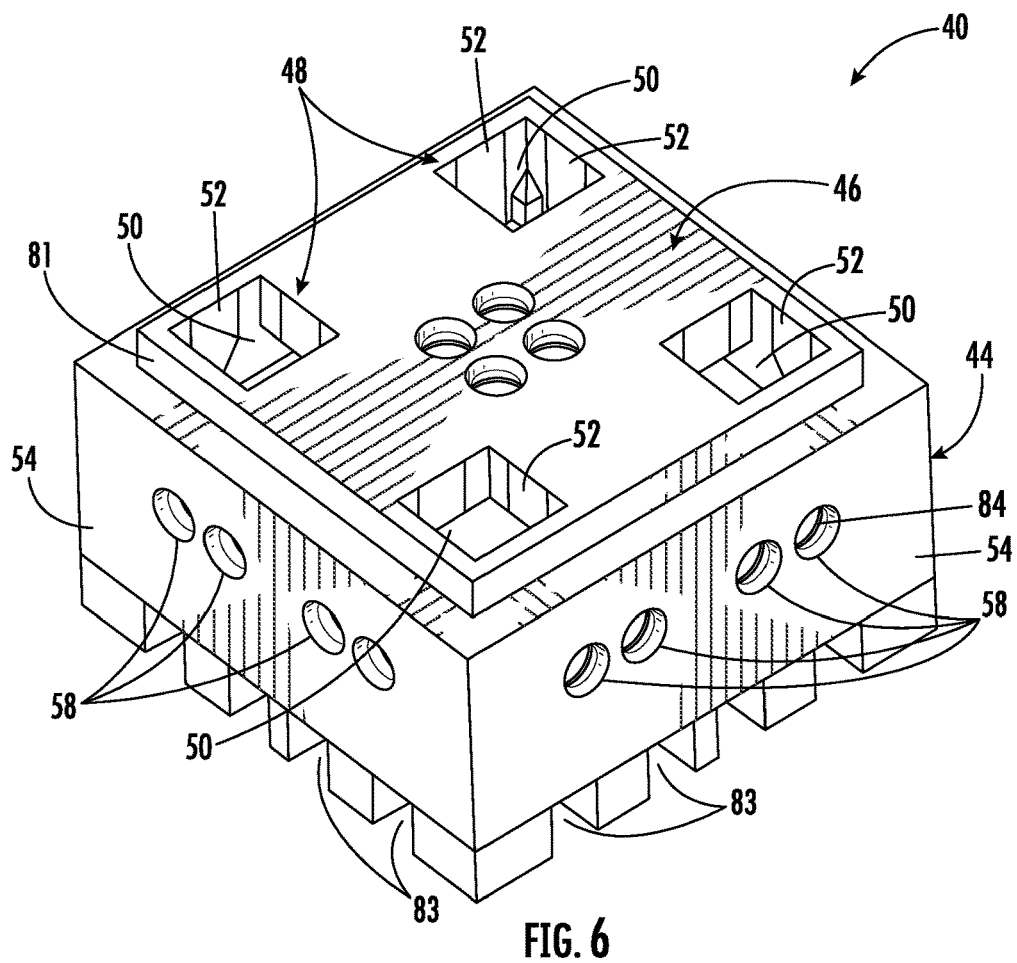
FIG. 6 is another isometric view of the optical module of FIG. 3 looking down at the bottom wall.

As shown in FIGS. 4 and 5, a respective optical device 62 is mounted within the interior cavity 45 of each housing 44, for example, an active photonic integrated circuit (PIC) or a passive photonic integrated circuit. As noted before with reference to FIG. 6, the conductive trace 52 within each opening 50 on the bottom wall 46 also extends upward along an interior surface of each side wall 54 within the interior cavity 45 (FIG. 5). At least one conductive trace 52 carried by the housing 44 is connected to the respective optical device 62 within the housing such as by a wire bond 70 as best illustrated in FIG. 5. Each housing 44 may include a number of conductive traces 52 as illustrated for potentially many different connections to the optical device 62 (FIG. 5) and to the conductive traces 36 on mounting posts 32 on the base 24, which may connect to different electronic components (not illustrated).

Figure 7:
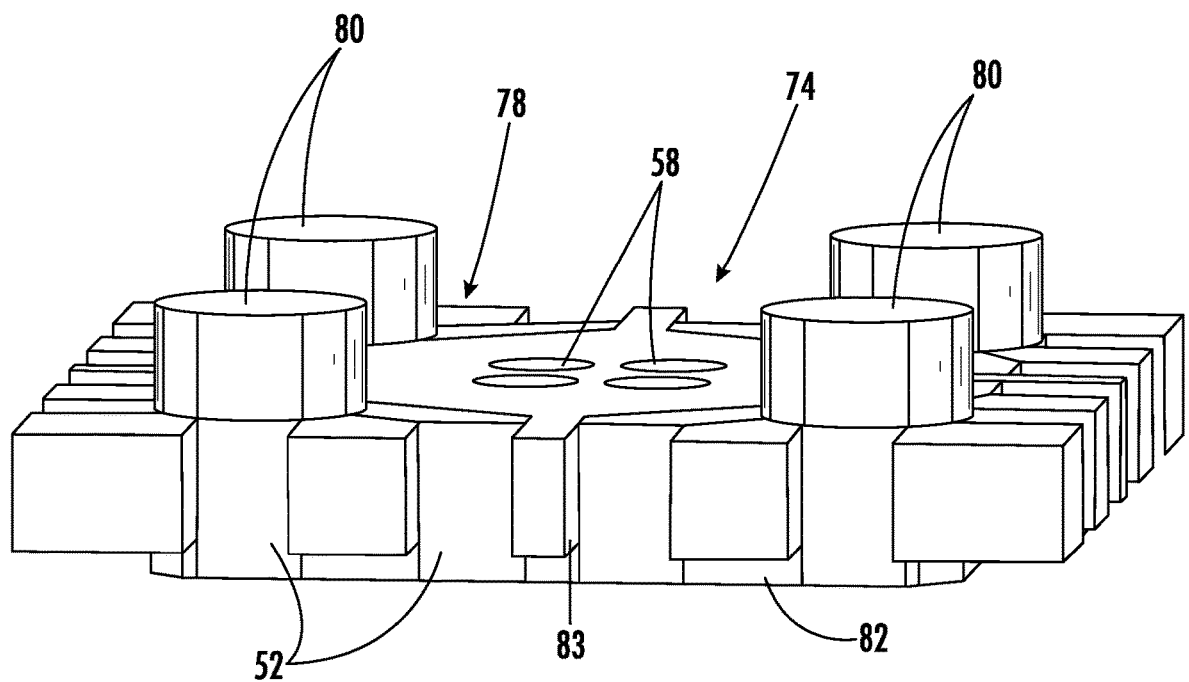
FIG. 7 is a side, isometric view of the top wall of the optical module of FIG. 3.

Each housing 44 of an optical module 40 has a top wall 74 defining a top wall mating feature surface 78 (FIGS. 4 and 7) compatible with the module mating feature surface 48 on the bottom wall 46 of another optical module, such that the optical modules can be stacked on top of each other as shown in FIGS. 1 and 2. In this example, the top wall 74 is formed as a lid that covers the interior cavity 45 and includes as part of the top wall mating feature surface 78 four conductive posts 80 (FIGS. 4 and 7). Each conductive post 80 includes conductive traces 52 that extend along the conductive posts and onto the side of the top wall 74 and engage the conductive traces on side walls 54 along the interior cavity 45. A lower portion of the housing 44 at the bottom wall 46 includes a rectangular configured, and in this example, a square configured ridge 81 that includes the four openings 50 (FIG. 6). The top wall 74 on its underside includes a square configured top ridge 82 as part of the lid that is configured to be received in fitted relation into the top section of the interior cavity 45. The conductive traces 52 extend along that top ridge 82 vertically (FIG. 7) and along the conductive post 80. The top wall 74 includes square configured cut-outs 83 that extend to the top ridge 82. The top wall 74 as a lid is received via its top ridge 82 within the top opening of the housing 44 at its interior cavity 45 in a fitted and snug relationship similar to a snap-in fitting. The conductive posts 80 on the top wall 74 are configured to be received within the openings 50 on the bottom wall 46 of another optical module 40, and thus, allow stacking of one or more optical modules 40 as shown in FIGS. 1 and 2.

As illustrated, each top wall 74 has at least one optical communication opening 58 therein and illustrated as four optical communication openings that align with respective optical communication openings 58 on the bottom wall 46, such as shown by the optical modules 40 of FIGS. 4 and 6. Thus, when the conductive posts 80 on the top wall 74 of a first optical module 40 engage with the openings 50 on the bottom wall 46 of a second stacked optical module, the respective optical communication openings 58 of the vertically stacked optical modules align with each other.

Whether optical modules 40 are in side-by-side or stacked relation, one or more optical communication openings 58 for a first optical module 40 align with the respective optical communication openings in a second adjacent or stacked optical module. To ensure that optical signals from one optical communication opening 58 pass to an adjacent opening, each optical communication opening includes a respective lens 84 such as a ball lens positioned therein as best shown in the schematic plan view of first and second optical modules 40*a*, 40*b* in FIG. 8. Depending on the type of optical device 62 positioned in the interior cavity 45 of the housing 44, a lens 84 may optically communicate with the optical device 62 contained within the housing 44 via optical communication waveguides or other optical communication techniques.

The optical device 62 could be an active or passive photonic integrated circuit. For example, an active photonic integrated circuit as the optical device 62 may be at least one of a source, a filter, a multiplexer, a receiver, a matrix math device, a switch, a demultiplexer, a tunable dispersion compensator, and a channel add/drop device. A passive photonic integrated circuit as the optical device 62 may be at least one of a waveguide, a splitter, and a combiner. Thus, depending on the type of active or passive photonic integrated circuit, one or more optical communication openings 58 located on the bottom wall 46, side wall 54, or top wall 74 of an optical module 40 could be employed for communication by the photonic integrated circuit and communicate with another optical communication opening in a stacked or side-by-side positioned optical module.

Figure 8:
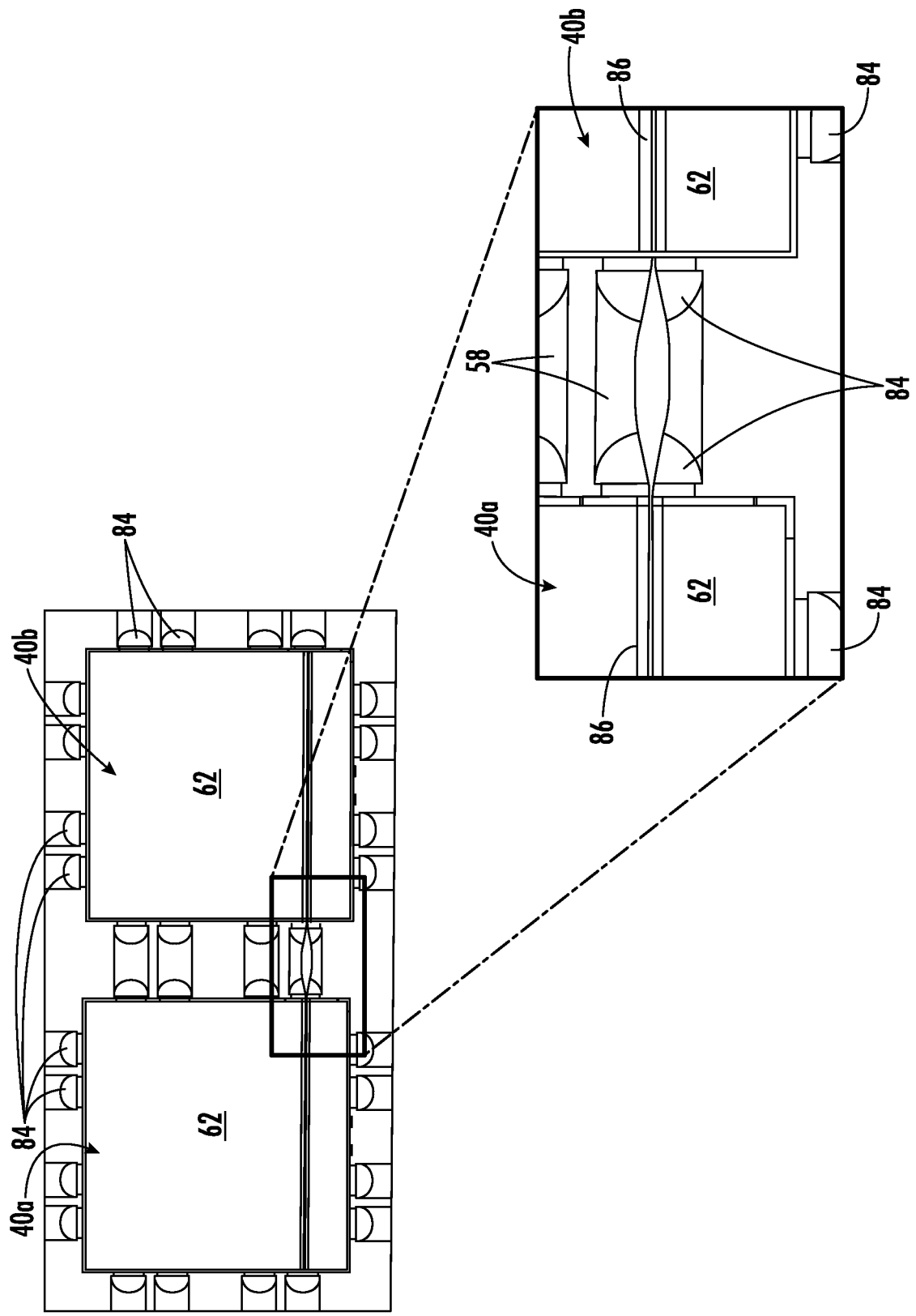
FIG. 8 is a schematic plan view of two optical modules having optical communication openings aligned with each other.

An example of how the optical communication openings 58 align is shown in the schematic diagram of FIG. 8 and illustrates how a lens 84 in an optical communication opening 58 of a first optical module 40a may align with the optical communications opening in a second optical module 40b when the optical modules are positioned in an adjacent, side-by-side relation. The light is diffracted and passes from the first optical module 40a to the second optical module 40b. In that example, each optical device 62 includes an illustrated waveguide 86.

Figure 9:
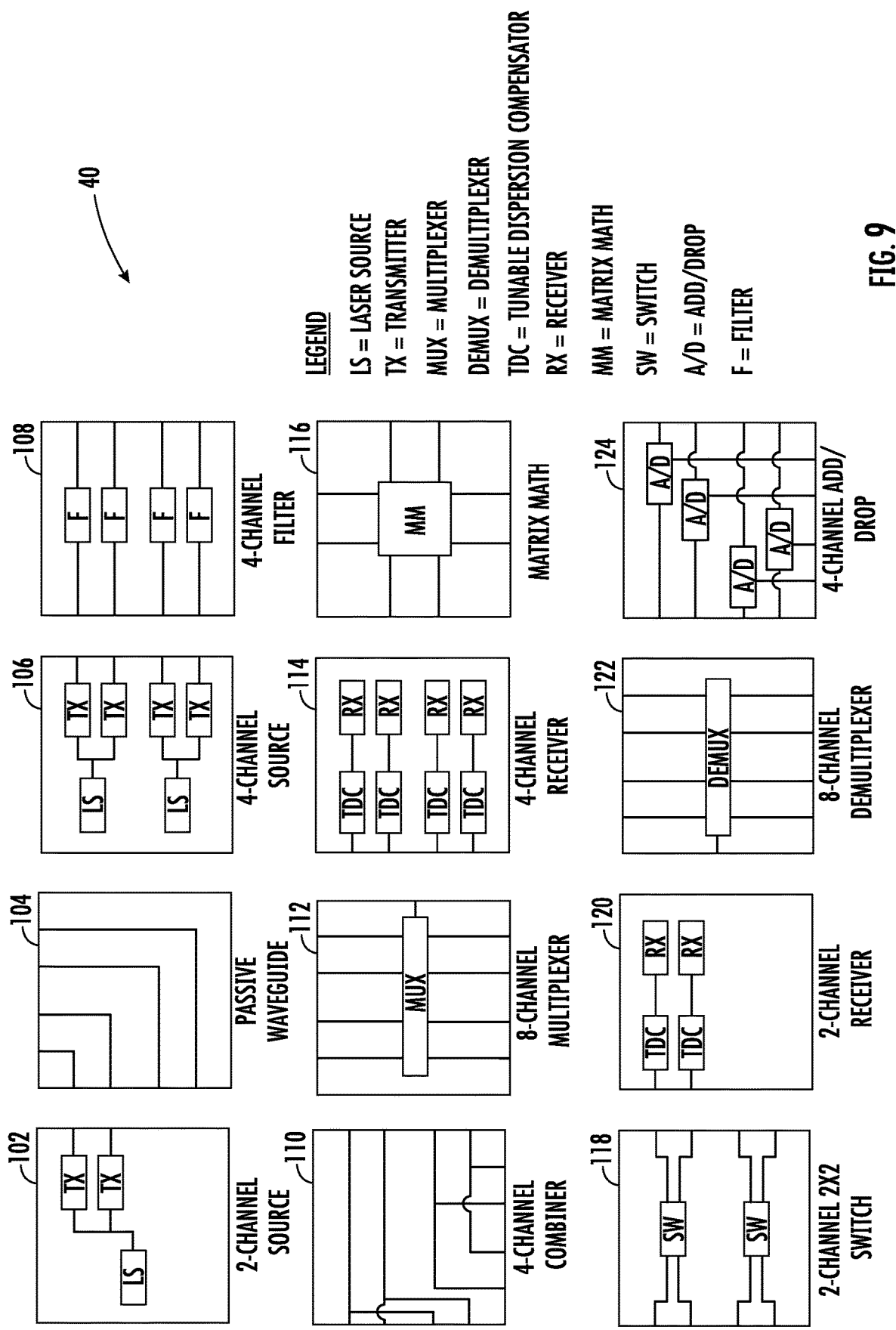
FIG. 9 is a schematic plan view of twelve (12) different optical modules, each having a different optical device and a legend indicating the functionality of each optical module.

Examples of schematic diagrams of optical modules 40 and a legend indicating the functions for the optical modules imparted by respective different optical devices 62 are shown in FIG. 9. A two-channel source 102 includes a laser source (LS) and two transmitters (TX). A passive waveguide 104 includes four optical traces for passing light via a waveguide, for example. A four-channel source 106 includes two laser sources and four transmitters, and a four-channel filter 108 includes four filters and corresponding inputs and outputs. A four-channel combiner 110 includes optical traces with four optical communication inputs on one side combining into two optical communication outputs on the opposite side and four optical communication inputs on another adjacent side combining into two optical communication outputs. An eight-channel multiplexer 112 includes inputs and outputs and a primary multiplexer. A four-channel receiver 114 includes four tunable dispersion compensators and four receivers. A matrix math photonic integrated circuit 116 includes signal inputs and outputs and a matrix math processor for calculating a rectangular array or table of numbers, symbols or expressions. A two-channel 2×2 switch 118 includes four inputs and outputs and two different switches. A two-channel receiver 120 includes two tunable dispersion compensators and two receivers. An eight-channel demultiplexer 122 includes a demultiplexer device and a four-channel add/drop 124 includes four different add/drop components on the photonic integrated circuit.

Figure 10:
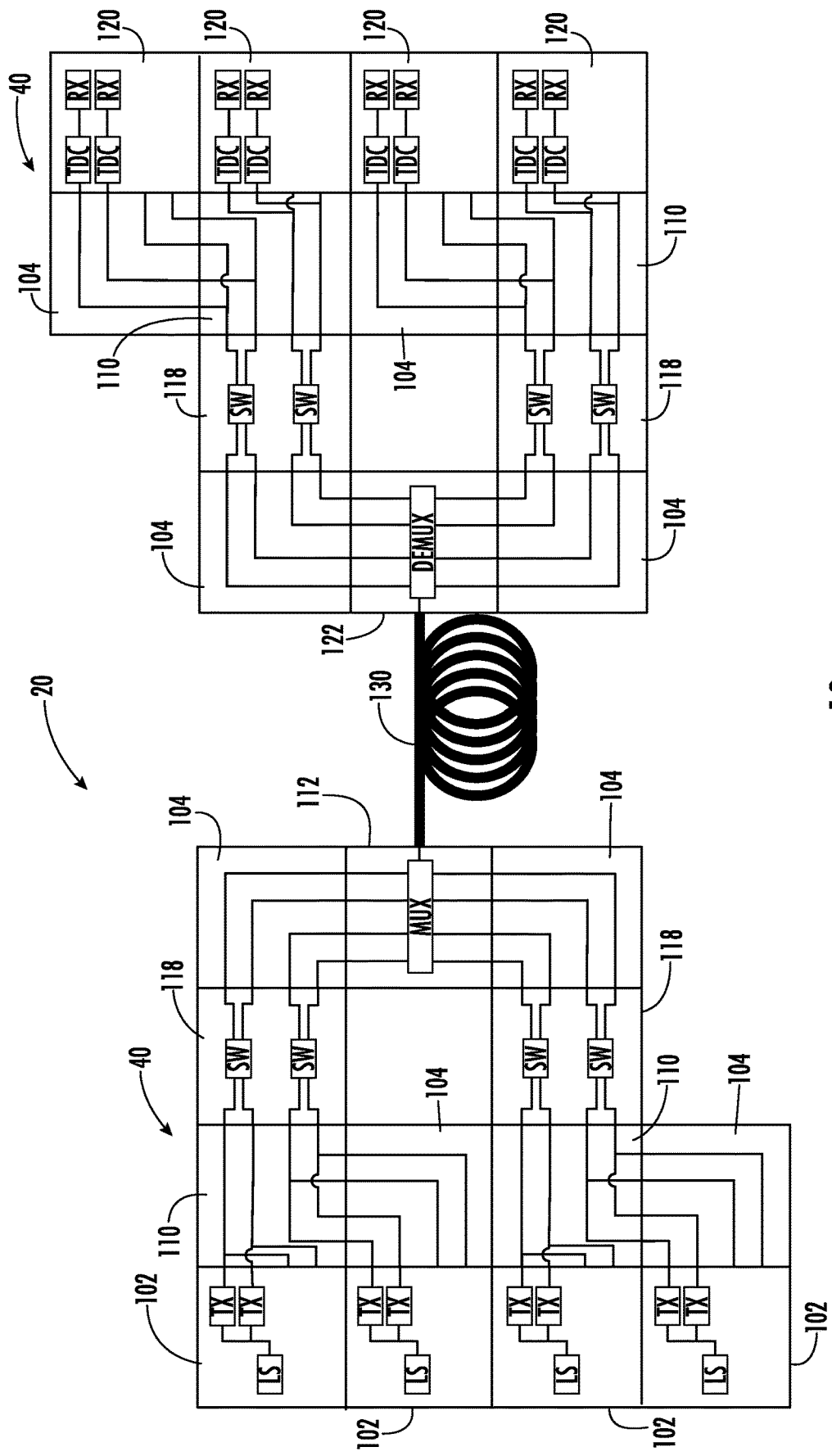
FIG. 10 is a schematic, plan view of an optical assembly having different optical modules forming a discretized, eight-channel communications system.

An example of an assembled optical assembly 20 is illustrated in the schematic block diagram of FIG. 10, showing a number of interconnected optical modules 40 of FIG. 9 that are positioned in side-by-side relation. Selected optical communication openings 58 in one optical module 40 are aligned with other optical communication openings of an adjacent optical module to pass light signals and form the optical assembly 20 as a discretized eight-channel payload or communications device. The respective optical modules 40 shown in FIG. 10 can be correlated with the example optical modules shown in FIG. 9 according to the legend and the respective individual reference numerals, with a multiplexer 112 connected at its output to an optical fiber 130, which connects into a demultiplexer 122. The optical modules 40 are indicated with reference numerals corresponding to the reference numbering of the optical modules in FIG. 9.

Figure 11:
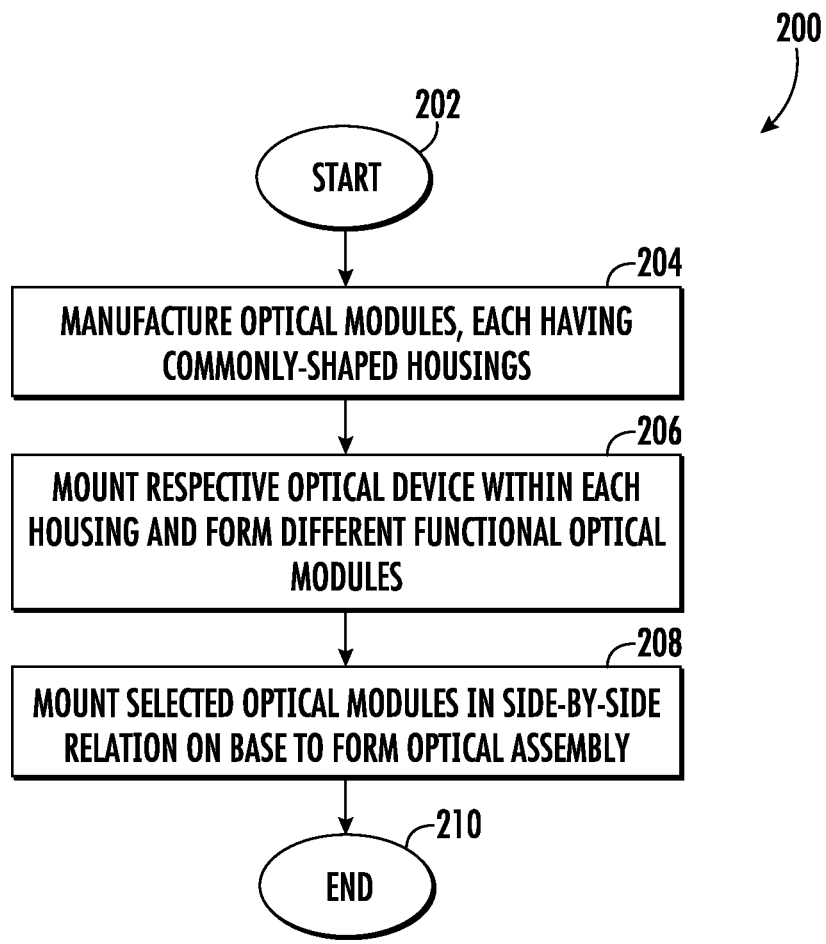
FIG. 11 is a high-level flowchart showing an example method for making the optical assembly.

In an example, the base 24 and optical modules 40, including the housings 44 and the top wall 74 as a lid of each optical module, may be manufactured from photocured polymer such as by additive manufacturing as explained in greater detail below. The flowchart in FIG. 11 illustrates at 200 a high-level process as an example method for making the optical assembly 20. The process starts (Block 202) and optical modules 20 are manufactured, such as by additive manufacturing, with each optical module having a commonly-shaped housing 44 (Block 204). Respective optical devices 62 are mounted within the interior cavity 45 of each housing 44 to form different functional optical modules 20 (Block 206) such as those illustrated in FIG. 9. Selected optical modules 20 are mounted in side-by-side relation on the base 24 to form the optical assembly 20 (Block 208). The process ends (Block 210).

An example of an additive manufacturing process allows a one micrometer manufacturing resolution using a 3-D printed high precision package for photonic systems. A common plastic like ABS and polypropylene may be applied to achieve a one-micron resolution with a 50×50×100 mm build volume, which includes micron and sub-micron levels of resolution and surface finish. A digital light processor (DLP) engine may be combined with adaptive optics to ensure a repeatable micron level of resolution.

In the example of the manufactured optical module 40 shown in FIGS. 1-8, each optical module may include a lens 84 received within a respective optical communication opening 58 and include single micron tolerance for each lens. However, up to a +/−4 microns tolerance may exist for each optical communication opening 58 and associated lens 84. Each optical module 40 may be about one centimeter square in a non-limiting example, but could vary in desired size depending on end-use applications.

The optical assembly 20 may be designed for testing and evaluation purposes or for direct end-use commercial applications. For example, different optical modules 40 may be selected and arranged in both planar and stacked, vertical orientation to form a test circuit or be formed as an end-use commercial product.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An optical assembly comprising:
   a base comprising a body defining a base mating feature surface having a plurality of mounting posts, each having one or more conductive traces disposed on a portion of the mounting post; and
   a plurality of optical modules arranged in side-by-side relation on the base and in optical communication with each other;
   each optical module comprising a housing being commonly-shaped and commonly-sized with other housings, and each housing having a bottom wall defining a module mating feature surface comprising a plurality of openings, each coupled with respective mounting posts of the base mating feature surface, a plurality of sidewalls, each having at least one optical communication opening therein, at least one of the optical communication openings in the sidewall being aligned with an optical communication opening of an adjacent housing, and a top wall defining sides and a top wall mating feature surface comprising a plurality of conductive posts configured to be coupled with openings in the bottom wall of another stacked optical module, and cut-outs on each side of the top wall, each cut-out having a conductive trace formed thereon;

a respective optical device within each housing being aligned with a corresponding optical communication opening for direct optical communication with at least one optical device of an adjacent optical module; and at least one conductive trace formed at each opening of each optical module and connected to a conductive trace disposed on a respective coupled mounting post and extending upward inside the housing to connect to a conductive trace on a respective cut-out of the top wall, and a wire bond connected between the respective optical device within the housing and at least one conductive trace inside the housing.

2. The optical assembly of claim 1 wherein each top wall has at least one optical communication opening therein.

3. The optical assembly of claim 1 wherein the at least one optical device comprises an active photonic integrated circuit (PIC).

4. The optical assembly of claim 3 wherein the active PIC comprises at least one of a source, a filter, a multiplexer, a receiver, a matrix math device, a switch, a demultiplexer, a tunable dispersion compensator, and a channel add/drop device.

5. The optical assembly of claim 1 wherein the at least one optical device comprises a passive photonic integrated circuit (PIC).

6. The optical assembly of claim 5 wherein the passive PIC comprises at least one of a waveguide, a splitter, and a combiner.

7. The optical assembly of claim 1 comprising a respective lens in each optical communication opening.

8. The optical assembly of claim 1 wherein the housing comprises a photocured polymer.

9. An optical module for an optical assembly comprising a base comprising a body defining a base mating feature surface having a plurality of mounting posts, each having one or more conductive traces disposed on a portion of the mounting post, the optical module to be arranged in side-by-side relation with an adjacent optical module on the base and in optical communication with the adjacent module, the optical module comprising:

a housing being commonly-shaped and commonly-sized with other housings, and the housing having a bottom wall defining a module mating feature surface comprising a plurality of openings each coupled with a respective mounting post of the base mating feature surface, and a plurality of sidewalls, each having at least one optical communication opening therein, at least one of the optical communication openings in a sidewall being aligned with an optical communication opening of an adjacent housing, a top wall defining sides and a top wall mating feature surface comprising a plurality of conductive posts configured to be coupled with openings in the bottom wall of another stacked optical module, and cut-outs on each side of the top wall, each cut-out having a conductive trace thereon;

an optical device within the housing being aligned with the optical communication opening for direct optical communication with at least one optical device of an adjacent optical module; and at least one conductive trace formed at each opening of the optical module and connected to a conductive trace disposed on a respective coupled mounting post and extending upward inside the housing and being connected to a conductive trace on a cut-out of the top wall, and a wire bond connected between the optical device within the housing and the at least one conductive trace inside the housing.

10. The optical module of claim 9 wherein the top wall has at least one optical communication opening therein.

11. The optical module of claim 9 wherein the optical device comprises an active photonic integrated circuit (PIC).

12. The optical module of claim 11 wherein the active PIC comprises at least one of a source, a filter, a multiplexer, a receiver, a matrix math device, a switch, a demultiplexer, a tunable dispersion compensator, and a channel add/drop device.

13. The optical module of claim 9 wherein the optical device comprises a passive photonic integrated circuit (PIC).

14. The optical module of claim 13 wherein the passive PIC comprises at least one of a waveguide, a splitter, and a combiner.

15. The optical module of claim 9 comprising a respective lens in the at least one optical communication opening.

16. The optical module of claim 9 wherein the housing comprises a photocured polymer.

17. A method for making an optical assembly comprising:

mounting a plurality of optical modules arranged in side-by-side relation on a base comprising a body defining a base mating feature surface having a plurality of mounting posts, each having one or more conductive traces disposed on a portion of the mounting post, and the optical modules being in optical communication with each other;

each optical module comprising a housing being commonly-shaped and commonly-sized with other housings, and each housing having a bottom wall defining a module mating feature surface comprising a plurality of openings coupled with respective mounting posts of the base mating feature surface, a plurality of sidewalls, each sidewall having at least one optical communication opening therein, at least one of the optical communication openings in a sidewall being aligned with an optical communication opening of an adjacent housing, a top wall defining sides and a top wall mating feature surface comprising a plurality of conductive posts configured to be coupled with openings in the bottom wall of another stacked optical module, and cut-outs on each side of the top wall, each cut-out having a conductive trace formed thereon;

mounting a respective optical device within each housing, and at least one optical communication opening being aligned with a corresponding optical communication opening for direct optical communication with at least one optical device of an adjacent optical module;

forming at least one conductive trace at each opening of the optical module that connects to a conductive trace disposed on a respective coupled mounting post, the conductive trace extending upward inside the housing to a conductive trace on a respective cut-out of the top wall; and connecting a wire bond between the respective optical device within the housing and at least one conductive trace inside the housing.

18. The method of claim 17 wherein each top wall has at least one optical communication opening therein.

19. The method of claim 17 wherein at least one optical device comprises an active photonic integrated circuit (PIC).

20. The method of claim 17 wherein at least one optical device comprises a passive photonic integrated circuit (PIC).

21. The method of claim 17 comprising forming each housing by additive manufacturing.

* * * * *